(12) United States Patent
Dayton et al.

(10) Patent No.: US 6,676,105 B2
(45) Date of Patent: Jan. 13, 2004

(54) SELF-CONTAINED HYDRAULIC DAMPENING FOR A SOLENOID OPERATED SPOOL VALVE

(75) Inventors: Robert A. Dayton, Attica, MI (US); Don W. Hines, North Street, MI (US); George Kasper, Washington, MI (US)

(73) Assignee: Eaton Corporation, Cleveland, OH (US)

( * ) Notice: Subject to any disclaimer, the term of this patent is extended or adjusted under 35 U.S.C. 154(b) by 208 days.

(21) Appl. No.: 10/022,872

(22) Filed: Dec. 20, 2001

(65) Prior Publication Data

US 2003/0116735 A1 Jun. 26, 2003

(51) Int. Cl.[7] .............................................. F16K 31/12
(52) U.S. Cl. ....................................... 251/54; 137/514.5
(58) Field of Search .................. 251/48, 54; 137/514.5; 303/119.2; 92/85 B, 143

(56) References Cited

U.S. PATENT DOCUMENTS 2,469,038 A * 5/1949 Winkler ..................... 236/92 R
3,730,215 A * 5/1973 Conery et al. .............. 137/494

\* cited by examiner

Primary Examiner—Edward K. Look
Assistant Examiner—John K Fristoe, Jr.
(74) Attorney, Agent, or Firm—Roger A. Johnston

(57) ABSTRACT

A reservoir is provided for a hydraulic dampening chamber at the end of a spool valve with a snap on cap having a labyrinth or baffled fluid entry passage formed in the closed end of the cap.

12 Claims, 3 Drawing Sheets

SELF-CONTAINED HYDRAULIC DAMPENING FOR A SOLENOID OPERATED SPOOL VALVE

BACKGROUND OF THE INVENTION

The present invention relates to hydraulic valves and particularly spool valves of the type operated by an electromagnetic solenoid. Valves of this type are employed in control systems for hydraulically actuated devices and in particular where it is desired to provide a modulated control pressure by controlling exhaust or bleed flow from a pressurized source to produce the desired control pressure to the hydraulic circuit for actuating the device to be controlled.

Applications of the aforesaid type are found in controlling the shifting of an automatic power transmission in a motor vehicle. Certain automatic vehicle power transmissions employ a plurality of solenoid operated control valves mounted on the transmission for providing shift control of the hydraulic actuators for the transmission clutches in response to control signals from an electronic controller.

Heretofore solenoid operated valves employed for shift control of vehicle automatic power transmissions have employed spool-type valve members with hydraulic dampening of the spool provided by a chamber at the end of the spool with a restrictive orifice for limiting flow therethrough to thereby provide hydraulic dampening of the spool motion. It is known to provide for filling of the hydraulic dampening chamber from the sump in the vehicle power transmission. However, when the level of fluid in the sump falls below or is drawn away from the orifice in the dampening chamber, the dampening chamber is drained and upon subsequent operation of the valve insufficient hydraulic dampening is provided. Without the hydraulic dampening of the spool motion, it has been found that the valve exhibits instability and erratic operation in response to the energization of the solenoid. This has been found particularly troublesome where the solenoid operated valve is modulated as, for example, by a pulse width modulated signal.

The problem is particularly aggravated by conditions where the vehicle is parked on a grade sufficiently steep to cause the fluid in the transmission sump to drain away from the bleed orifice in the valve resulting in draining the dampening chamber. Thus, it has long been desired to provide a way or means of maintaining fluid in a hydraulic dampening chamber of a spool-type valve, particularly solenoid operated spool valves in a manner which is low in cost and easy to manufacture and assemble in high volume production.

BRIEF SUMMARY OF THE INVENTION

The present invention provides a self-contained fluid reservoir for a dampening chamber in a spool-type valve and which is readily assembled to the valve during manufacture of the valve and which retains fluid in a chamber for continued hydraulic dampening after the valve is withdrawn from the fluid source. The present invention employs a baffled or labyrinth fluid passage for exclusive entry of fluid to the dampening chamber such that upon withdrawal of the valve from the fluid source, sufficient fluid is trapped in the labyrinth to provide hydraulic dampening upon energization of the valve for an initial period until the fluid source is resumed. In the presently preferred practice the invention includes a cap assembled over the spool end of the valve for closing the dampening chamber with a labyrinth entry passage formed in the closed end of the cap. The cap may be snap-locked over the end of the valve dampening chamber for relatively low cost and ease of assembly during manufacturing of the valve.

DETAILED DESCRIPTION OF THE INVENTION

Figure 1:
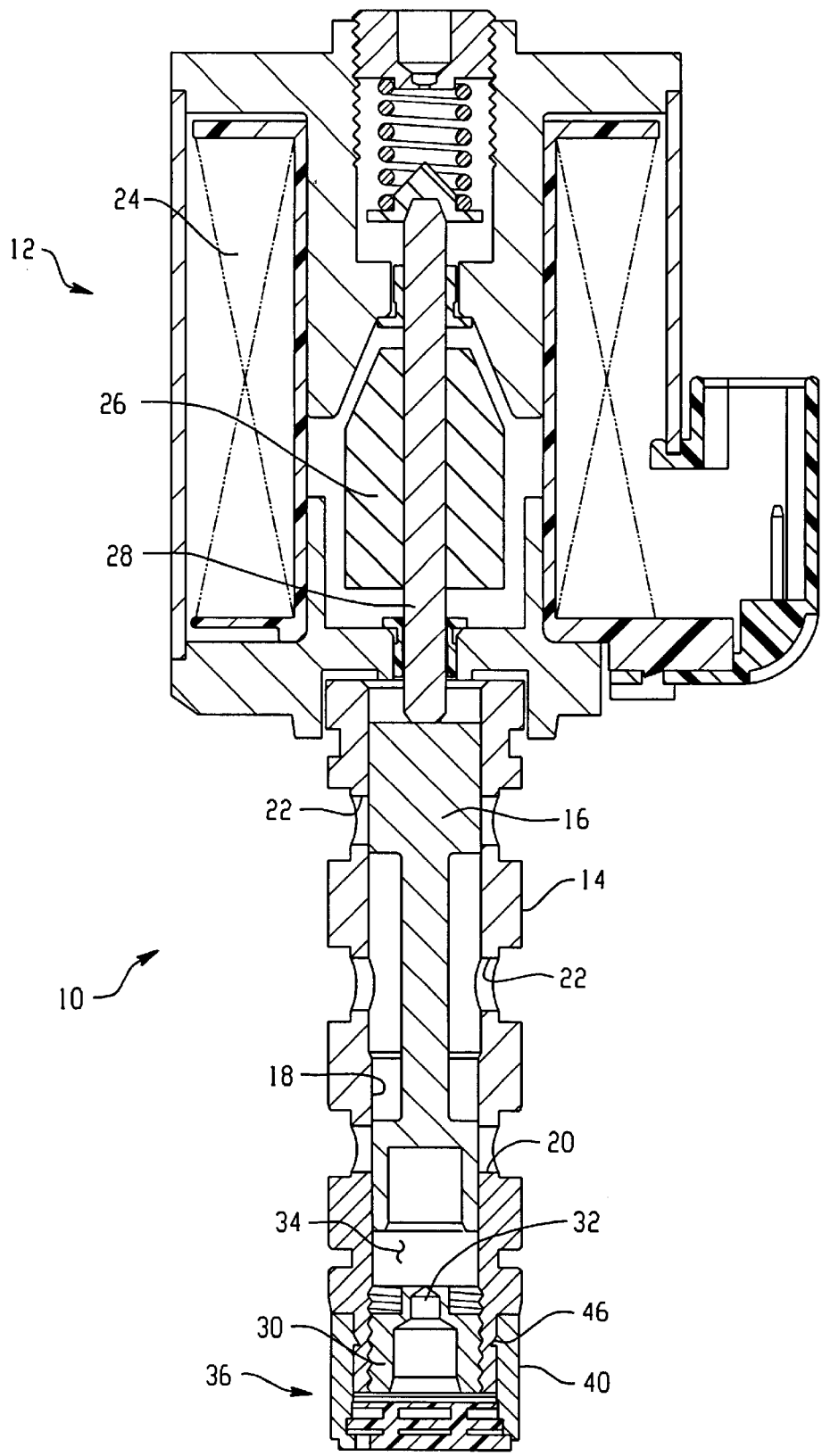
FIG. 1 is a cross-section of a solenoid operated spool-type valve employing the self-contained reservoir feature of the present invention.
Figure 2:
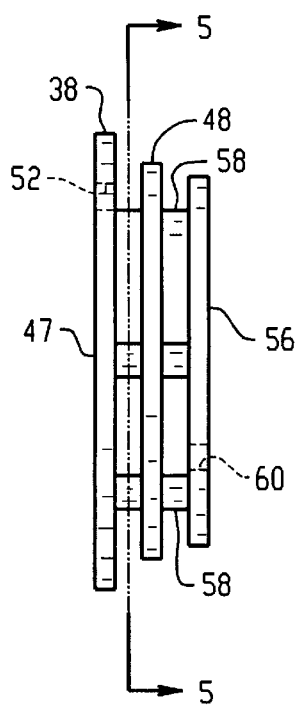
FIG. 2 is a side view of the end of the reservoir cap employed in the assembly of FIG. 1.
Figure 3:
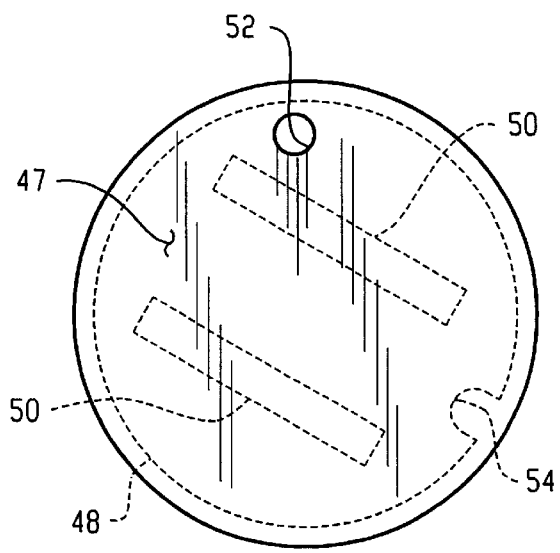
FIG. 3 is a left side view of the cap of FIG. 2.
Figure 4:
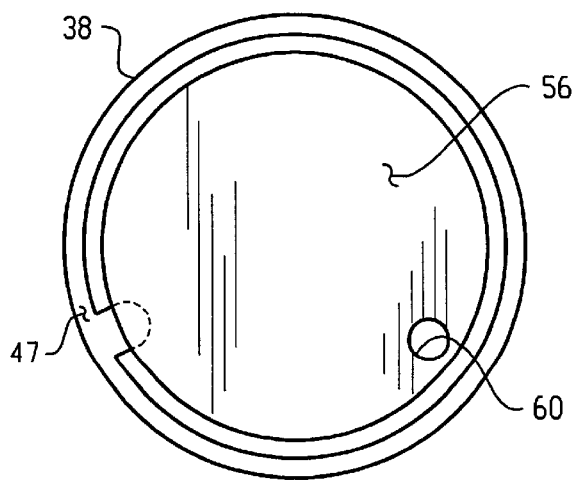
FIG. 4 is a right side view of the cap of FIG. 2.
Figure 5:
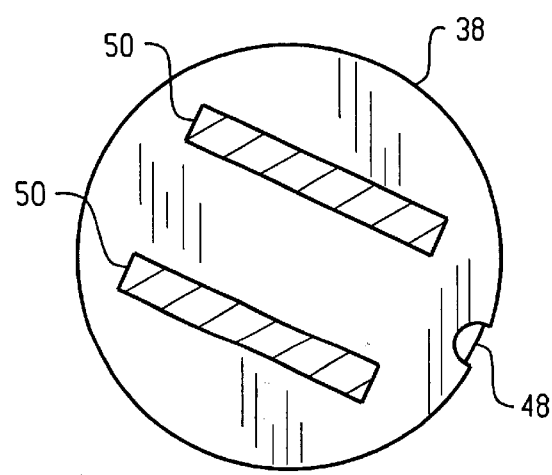
FIG. 5 is a section view taken along section indicating lines 5—5 of FIG. 2; and, FIG. 6 is a perspective view of the reservoir cap of the invention of FIG. 1 with portions thereof broken away.

Referring to FIG. 1, a valve assembly employing the present invention is indicated generally at 10 and includes a solenoid operator indicated generally at 12 attached to a valve body 14 which has slidably disposed therein in a valving bore 18 communicating with a pressure inlet port 20 and a signal outlet or control pressure port 22 spaced along bore 18 from the inlet port 20. An exhaust or return to sump port 22 is disposed on the opposite side of the control port 22 from the inlet port 20.

The solenoid operator 12 includes a coil 24, armature 26 and an operating rod 28 moveable with the armature and operative to contact and effect movement of the spool 16. The valving bore 18 is closed at the lower end thereof by a closure 30 which defines therein a fluid metering or dampening orifice 32 which controls the flow of fluid into a chamber 34 formed about the lower end of the spool and which chamber serves as a hydraulic reservoir for hydraulic dampening of the restricted flow of fluid through orifice 32 for effecting motion of the spool in bore 18.

A reservoir defining cap 36 is received over the end of the valve body 14 and provides exclusive fluid communication from an external source, such as a sump (not shown) and the orifice 32.

Figure 6:
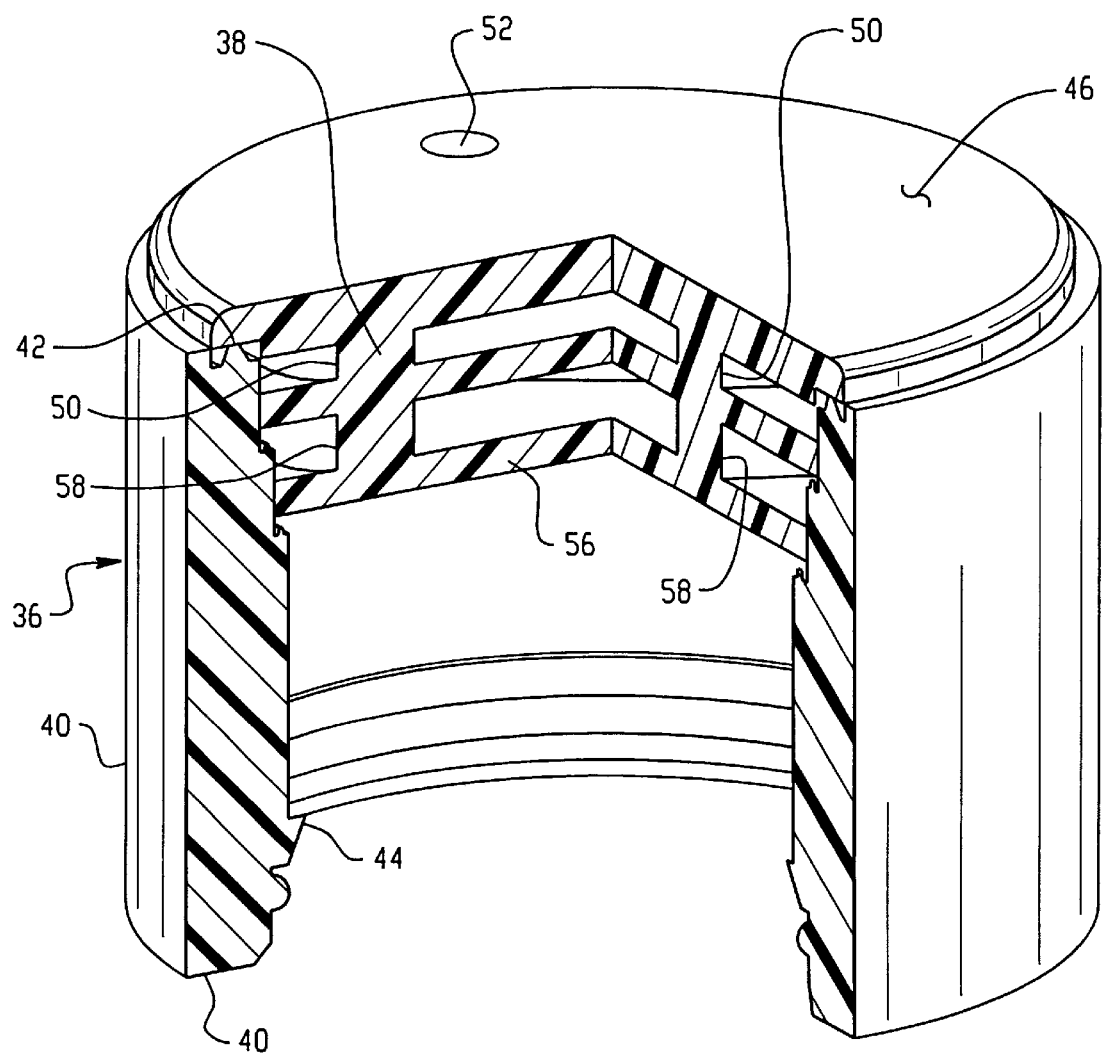

Referring to FIGS. 2 through 6, the reservoir cap in one embodiment may be formed of an end piece 38 and an annular wall portion 40 which may be joined in any suitable manner as, for example, weldment about the annular contact surface 42 shown in FIG. 6.

The annular member 40 has a snap engagement surface which may comprise an annular barb 44 provided on the inner periphery thereof adjacent the open end, which barb is operative to engage with a corresponding engagement surface preferably groove 46 formed in the outer periphery near the lower end of the valve body 14 (see FIG. 1).

The end piece 38 preferably is configured to have an outer baffle or bulkhead 46 spaced from an intermediate baffle 48 by a pair of spaced stanchions or spacers 50. The outer baffle 46 has a fluid entry port 52 therethrough; and, the intermediate baffle 48 has a fluid passage therethrough preferably comprising notch 54 formed in the outer periphery thereof and staggered from port 52.

A third or inner baffle or bulkhead 56 is disposed in spaced arrangement from the intermediate baffle 48 by a pair of standoffs or spacers 58; and, the inner baffle 56 has a fluid passage 60 formed therethrough. It will be understood that passage 52, slot 54 and passage 60 are staggered such that there is no direct alignment of the fluid passage between the outside surface of outer baffle 46 and the inner surface of inner baffle 56. Thus, the space intermediate the baffles serves as a reservoir for fluid; and, any particular or certain orientation of the end piece 38 with respect to the fluid level in the sump will not permit complete drainage of the fluid therefrom. Thus upon energization of the valve solenoid and movement of the spool, fluid will be available for metered flow through the dampening orifice 32.

The present invention thus provides a simple, relatively low cost and easy to fabricate arrangement for the end of a spool valve to provide a self-contained reservoir of fluid over the metering orifice communicating with the hydraulic dampening chamber for the spool valve member.

Although the invention has hereinabove been described with respect to the illustrated embodiments, it will be understood that the invention is capable of modification and variation and is limited only by the following claims.

What is claimed is:

1. A method of providing a fluid reservoir for a hydraulic dampening chamber in a valve comprising:
    (a) forming a cup-shaped member with baffled passages forming baffled chambers through the closed end of the cup shape; and,
    (b) disposing the rim of the cup-shaped member over the dampening chamber of the valve and retaining the cup-shaped member thereover and restricting communication to said chamber through the baffled passages.

2. The method defined in claim 1, wherein said step of forming a cup-shaped member includes weldment.

3. The method defined in claim 1, wherein said step of retaining includes snap locking.

4. The method defined in claim 1, wherein said step of forming said cup-shaped member includes forming an annular member and closing one axial end thereof with a hollow disc having a baffled passage therethrough.

5. In combination a valve having a hydraulic dampening chamber for connection to a fluid source and a fluid reservoir therefor comprising:
    (a) a generally cup-shaped member having the side wall of the cup shape attached to the dampening chamber of the valve with the closed end portion of the cup-shaped member extending across the inlet port;
    (b) said closed end of said cup-shape having a baffled passage forming baffled chambers therethrough providing exclusive communication with the dampening chamber from the exterior thereof, wherein upon connection of the valve to a source of pressurized fluid and termination of fluid flow therefrom, fluid is trapped in said chamber by said baffled passage thereby providing a reservoir of fluid for said chamber.

6. The combination defined in claim 5, wherein said cup-shaped member includes a tubular member forming the side wall thereof and a closure member having a plurality of baffle chambers therein attached to one end of said tubular member for forming the closed end thereof.

7. The combination defined in claim 6, wherein the closure member is attached to the tubular member by weldment.

8. The combination defined in claim 5, wherein the side wall of the cup-shaped member is attached to the dampening chamber by barbed engagement.

9. The combination defined in claim 5, wherein the side wall of the cup-shaped member is attached to the inlet port by push on snap locking engagement.

10. The combination defined in claim 5, wherein said cup-shaped member is formed of non-metallic material and comprises a two-piece construction secured by weldment.

11. The combination defined in claim 5, wherein the baffled passage includes a plurality of baffle chambers formed between spaced disc-shaped partitions.

12. The combination defined in claim 11, wherein said disc-shaped portions are formed in a one-piece member.

* * * * *